(12) United States Patent
Chen et al.

(10) Patent No.: US 7,701,702 B2
(45) Date of Patent: Apr. 20, 2010

(54) COMPUTER ENCLOSURE

(75) Inventors: Yun-Lung Chen, Taipei Hsien (TW); Yu-Ming Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 314 days.

(21) Appl. No.: 11/693,700

(22) Filed: Mar. 29, 2007

(65) Prior Publication Data
US 2008/0116774 A1 May 22, 2008

(30) Foreign Application Priority Data
Nov. 22, 2006 (CN) .................. 2006 2 0015933 U

(51) Int. Cl.
*G06F 1/16* (2006.01)
*H05K 5/00* (2006.01)
*H05K 7/00* (2006.01)

(52) U.S. Cl. ........................... 361/679.33; 361/679.37

(58) Field of Classification Search .................. 361/685, 361/679.33, 679.37
See application file for complete search history.

(56) References Cited

U.S. PATENT DOCUMENTS

| | | | | |
|---|---|---|---|---|
| 5,784,251 A | * | 7/1998 | Miller et al. ............. | 361/679.6 |
| 6,529,373 B1 | * | 3/2003 | Liao et al. .............. | 361/679.33 |
| 6,644,762 B1 | | 11/2003 | Chen | |
| 6,798,652 B2 | * | 9/2004 | Wang et al. ............ | 361/679.33 |
| 6,882,527 B2 | * | 4/2005 | Wang et al. ............ | 361/679.33 |
| 6,908,338 B2 | * | 6/2005 | Okamoto ..................... | 439/607 |
| 6,909,047 B2 | * | 6/2005 | Zhang .................... | 361/679.33 |
| 6,956,737 B2 | * | 10/2005 | Chen et al. ............. | 361/679.39 |
| 6,969,131 B2 | * | 11/2005 | Chen et al. ............... | 312/223.2 |
| 7,369,403 B2 | * | 5/2008 | Chen et al. ............. | 361/679.33 |
| 7,441,744 B2 | * | 10/2008 | Chen et al. ............. | 361/679.33 |
| 7,450,376 B2 | * | 11/2008 | Chen et al. ............. | 361/679.33 |
| 2003/0222555 A1 | * | 12/2003 | Mansueto ................ | 312/330.1 |
| 2005/0040306 A1 | * | 2/2005 | Chen et al. ............... | 248/298.1 |
| 2005/0103729 A1 | * | 5/2005 | Chen et al. .................... | 211/26 |
| 2005/0190535 A1 | * | 9/2005 | Peng et al. .................. | 361/685 |
| 2006/0126288 A1 | * | 6/2006 | Chen et al. .................. | 361/685 |
| 2008/0130245 A1 | * | 6/2008 | Chen et al. .................. | 361/683 |

\* cited by examiner

*Primary Examiner*—Jayprakash N Gandhi
*Assistant Examiner*—Adrian S Wilson
(74) *Attorney, Agent, or Firm*—Wei Te Chung

(57) ABSTRACT

A computer enclosure includes a chassis (10) and a bracket (20) secured in the chassis. The chassis includes a bottom plate (201), a side plate (11) and a rear plate (15) perpendicularly connected with each other. The side plate defines a first mounting slot (14) and a second mounting slot (12). A pole (17) is disposed on the bottom plate. The bracket defines a post (251) being capable of sliding into the first mounting slot and a bent piece (27) capable of inserting into the second mounting slot. The bracket is supported on the pole of the bottom plate.

16 Claims, 4 Drawing Sheets

United States Patent US 7,701,702 B2

COMPUTER ENCLOSURE

This application is related to co-pending U.S. patent application Ser. No. 11/681,195, filed on Mar. 2, 2007, and entitled "COMPUTER ENCLOSURE UTILIZING A MOUNTING APPARATUS". The present application and the co-pending application are assigned to the same assignee. The disclosure of the above-identified application is incorporated herein by reference.

BACKGROUND OF THE INVENTION

1. Field of the Invention

The present invention relates to computer enclosures, and more particularly to a computer enclosure with a bracket for a disk drive of a computer or a server.

2. Description of Related Art

Disk drives, such as an HDD (hard disk drive) and a CD-ROM (compact disc read-only memory) drive, are usually provided in a computer. Conventionally, the disk drives are secured in a bracket. The bracket is fixed on a chassis of a computer enclosure by bolts or rails. Fixing the bracket in the computer enclosure with bolts is unduly laborious and time-consuming. Furthermore, the computer enclosure needs extra operating space for carrying out the fixing operation. Since components of a computer are compactly arranged in the computer enclosure, the assembly and disassembly thereof is complicated and inefficient. Moreover, the components may be accidentally damaged. Fixing the bracket in the computer enclosure using rails is more convenient than using the above-described bolts. However, the rails are generally made of plastic. This leads to extra maintenance because of plastic rails more easily wear out and need replacement.

What is needed, therefore, is a computer enclosure having a bracket allowing easy installation in a computer.

SUMMARY OF THE INVENTION

A computer enclosure includes a chassis and a bracket secured in the chassis. The chassis includes a bottom plate, a side plate and a rear plate perpendicularly connected with each other. The side plate defines a first mounting slot and a second mounting slot. A pole is disposed on the bottom plate. The bracket defines a post being capable of sliding into the first mounting slot and a bent piece capable of inserting into the second mounting slot. The bracket is supported on the pole of the bottom plate.

Other advantages and novel features of the present invention will become more apparent from the following detailed description of preferred embodiment when taken in conjunction with the accompanying drawings, in which:

DETAILED DESCRIPTION OF THE INVENTION

Figure 1:
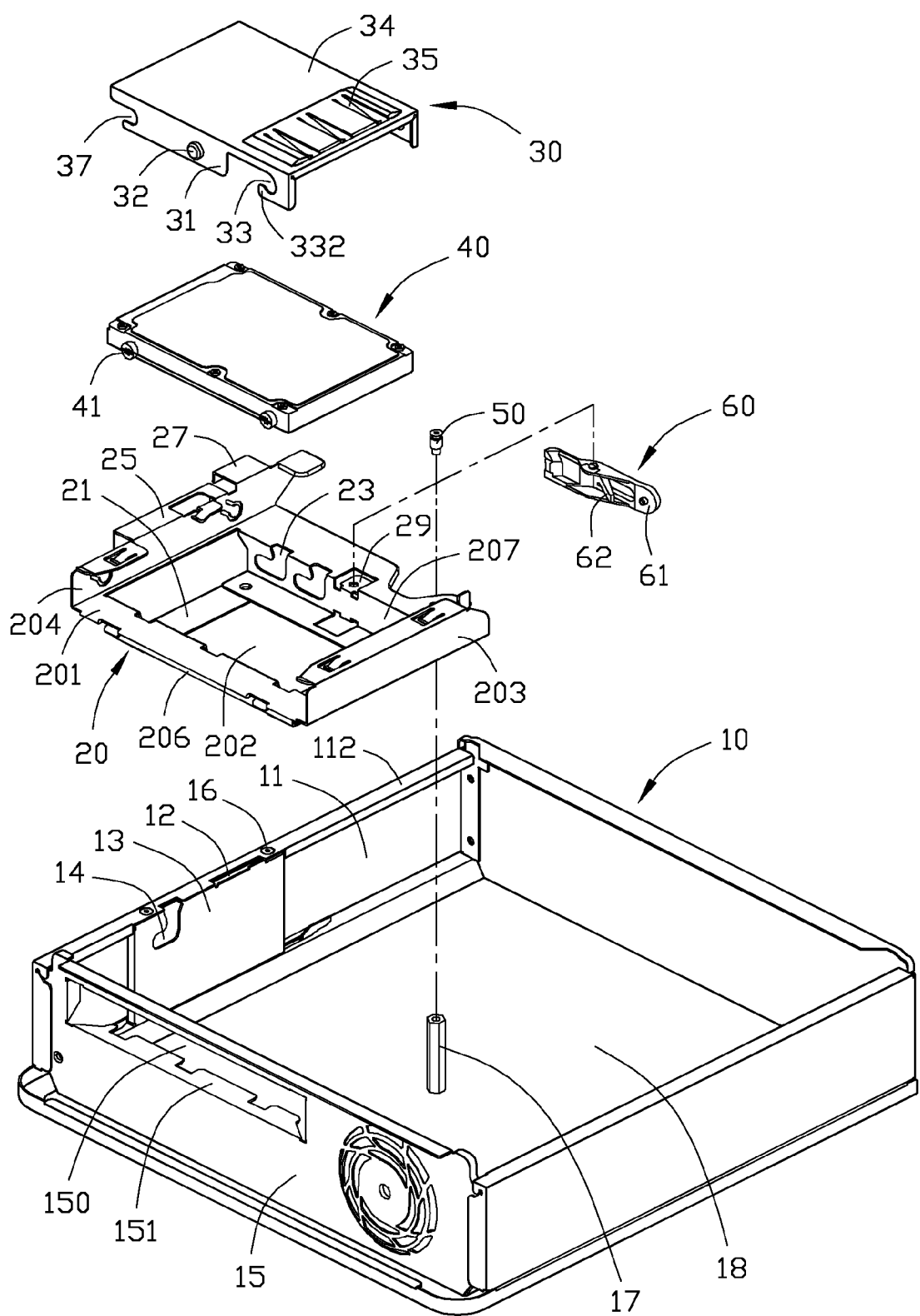
FIG. 1 is an exploded, isometric view of a computer enclosure and a disk drive of a preferred embodiment of the present invention, the computer enclosure including a chassis, a bracket, a tray, and a locking member.

Referring to FIG. 1, a computer enclosure of a preferred embodiment of the present invention includes a chassis 10, a bracket 20, a tray 30, and a locking member 60.

The chassis 10 includes a bottom plate 18, a side plate 11, and a rear plate 15. The side plate 11 and the rear plate 15 are perpendicular to each other, and respectively perpendicular to the bottom plate 18. A pole 17 with a mounting hole defined therein is disposed on an inner surface of the bottom plate 18. A rectangular opening 150 is defined in the rear plate 15. A support piece 151 is perpendicularly bent in from a bottom edge of the opening 150. A bent flange 112 is perpendicularly bent in from a top edge of the side plate 11. A securing piece 13 is fixed on an inner surface of the side plate 11 below the bent flange 112 with screws 16. An L-shaped latch slot 14 and a locking slot 12 are defined in the bent flange 112 of the side plate 11 and the securing piece 13. The latch slot 14 includes a horizontal portion generally parallel to the top edge of the side plate 11, and a vertical portion generally perpendicular to the top edge of the side plate 11.

Figure 2:
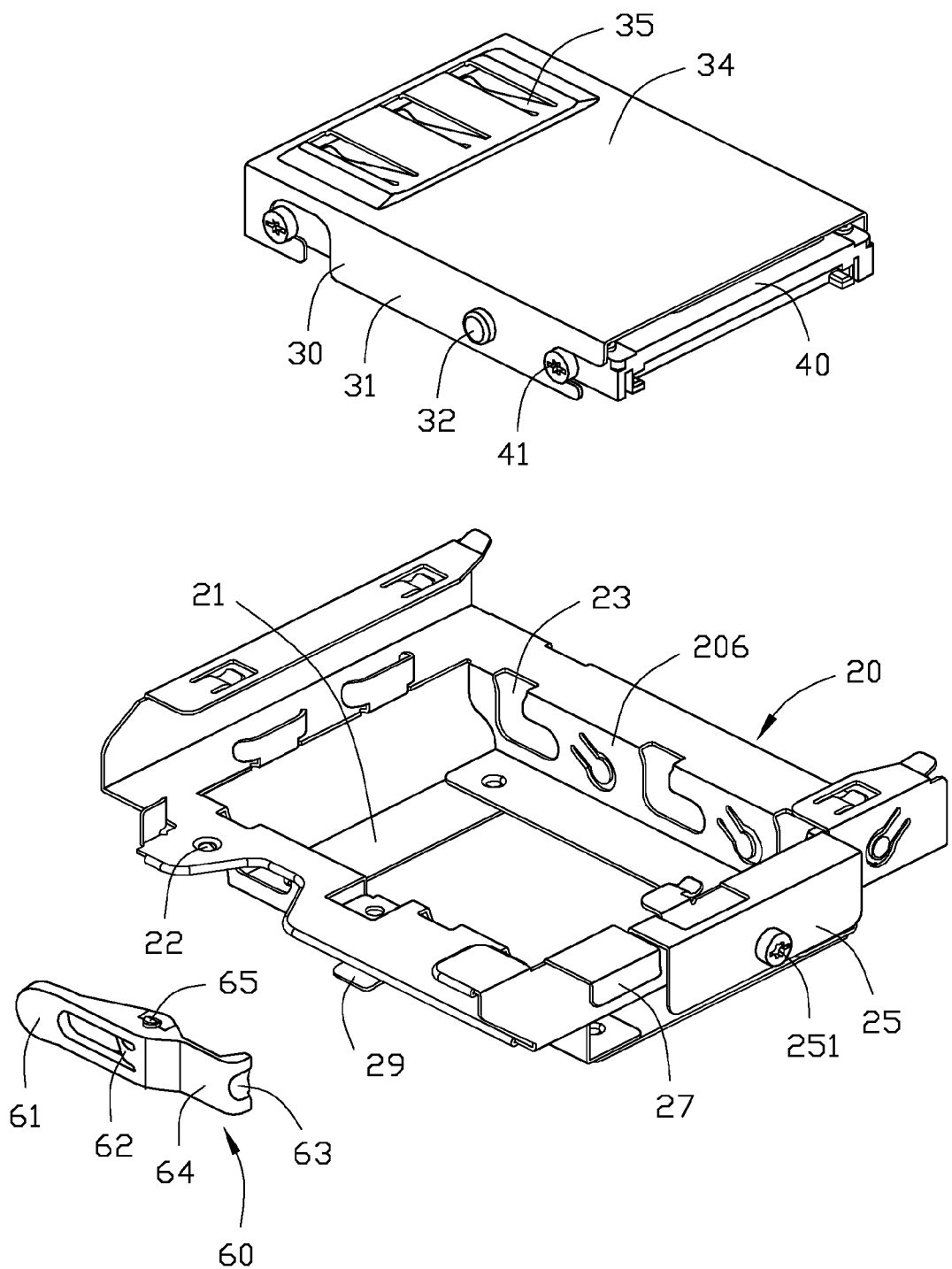
FIG. 2 is an isometric view of the bracket, the locking member, and assembly of the tray and the disk drive.

Referring also to FIG. 2, the tray 30 includes a top wall 34, and a pair of parallel side walls 31 perpendicularly bent down from opposite edges of the top wall 34. A plurality of resilient slanted finger pieces 35 is formed down on the top wall 34 by stamping. A generally L-shaped securing slot 33, and a cutout 37 are defined in each of the side walls 31. The securing slot 33 includes a horizontal portion generally parallel to a top edge of the side wall 31, and a vertical portion generally perpendicular to the top edge of the side wall 31. The cutout 37 extends in a direction parallel to the top edge of each side wall 31. A positioning portion 332 is formed on an end of a bottom edge of the horizontal portion of the securing slot 33. A post 32, which may be a screw, is fixed on each of the side walls 31 between the securing slot 33 and the cutout 37.

The bracket 20 includes a bottom wall 201, and two parallel first side walls 203, 204 extending up from opposite edges of the bottom wall 201 for securing a first disk drive (not shown) therebetween, such as a CD-ROM drive. An L-shaped first bent piece 25 and an L-shaped second bent piece 27 extend outward from a top edge of the first side wall 204. Each of the first and second bent pieces 25, 27 includes a horizontal portion perpendicular to the first side wall 204, and a vertical portion parallel to the first side wall 204. A post 251, which may be a screw, is fixed on the vertical portion of the first bent piece 25 of the first side wall 204, corresponding to the latch slot 14 of the side plate 11 of the chassis 10. The vertical portion of the second bent piece 27 can be inserted into the locking slot 12 of the side plate 11 and slide in the locking slot 12 along a direction parallel to the top edge of the side plate 11, so that the post 251 of the first bent piece 25 can be slid from the vertical portion to the horizontal portion of the latch slot 14. A rectangular opening 202, and a mounting hole 22 corresponding to the pole 17 of the chassis 10 are defined in the bottom wall 201. The top wall 34 of the tray 30 is parallel to the bottom wall 201 of the bracket 20 and covering the opening 202. Two parallel second side walls 206, 207 are bent down from opposite edges of the opening 202. The second side walls 206, 207 are perpendicular to the first side walls 203, 204. A bottom flange (not labeled) is perpendicularly bent in from each of the second side walls 206, 207. The bottom flanges of the second side walls 206, 207 are connected with two connecting pieces 21. Three L-shaped latch slots 23 are defined in each of the second side walls 206, 207. Each latch slot 23 includes a horizontal portion generally parallel to the top edges of the second side walls 206, 207, and a vertical portion generally perpendicular to the top edges of the second side walls 206, 207. A pair of upper and lower mounting pieces 29, each with a pivot hole (not labeled) defined therein, are perpendicularly formed on the second side wall 207.

The locking member 60 includes an operating portion 61 and a positioning portion 64. A pair of pivot shafts 65 is disposed on opposite sides of the locking member 60 respectively, between the operating portion 61 and the positioning portion 64. A resilient finger tab 62 extends aslant from the operating portion 61 for retaining the locking member 60 in an original position. A positioning slot 63 is defined in an outer end of the positioning portion 64.

Referring to FIGS. 1 and 2, a second disk drive 40, such as an HDD, with two posts 41 disposed respectively on opposite side walls is secured in the tray 30 between the side walls 31. The posts 41 are respectively positioned in the cutout 37 and the securing slot 33, and blocked by the positioning portions 332 from sliding in the horizontal portions of the securing slots 33. The finger pieces 35 are compressed by the top surface of the disk drive 40 and resiliently deformed to thereby urge the posts 41 to tightly abut against the corresponding positioning portions 332. When it is desired to detach the disk drive 40 from the tray 30, the disk drive 40 is pushed towards the top wall 34 of the tray 30 to resiliently deform the finger pieces 35. The posts 41 of the disk drive 40 are thereby disengaged from the positioning portions 332 of the securing slots 33, and can be thus slid out of the horizontal portions of the securing slots 33. Thus, the disk drive 40 can be taken away from the tray 30.

Figure 3:
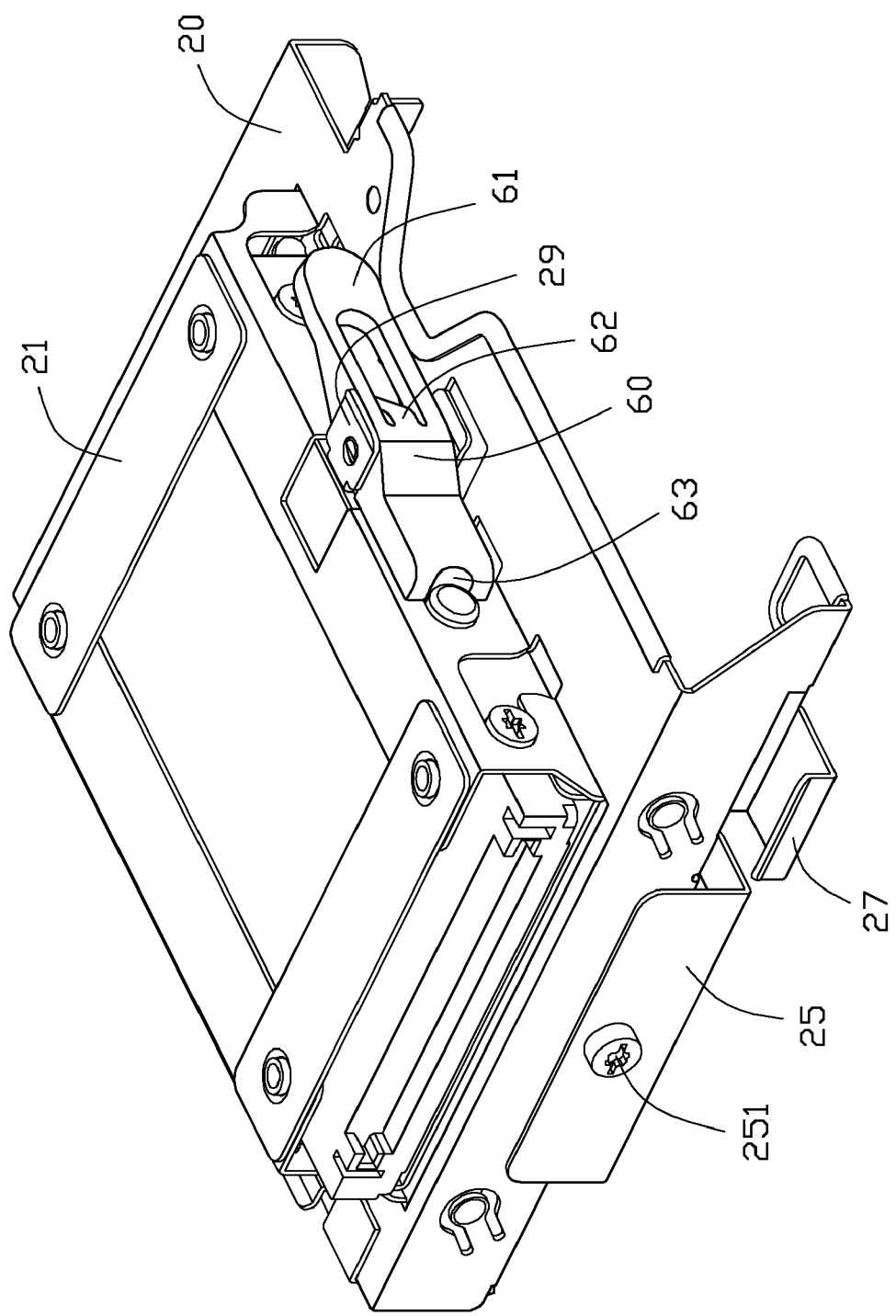
FIG. 3 is an assembled view of FIG. 2, but viewed from another aspect.

Referring to FIG. 3, the locking member 60 is pivotably secured between the mounting pieces 29 of the second side wall 207 with the pivot shafts 65 inserting into the corresponding pivot holes of the mounting pieces 29. The positioning portion 64 of the locking member 60 abuts on an outer surface of the second side wall 207, and the finger tab 62 is in an original state.

Referring to FIG. 3, the disk drive 40 together with the tray 30 is inserted between the first side walls 206, 207 of the bracket 20 through the opening 202 of the bottom wall 201, along a vertical direction perpendicular to the bottom wall 201. The posts 32 of the tray 30 and the posts 41 of the disk drive 40 are respectively slid into the latch slots 23 of the second side walls 206, 207 of the bracket 20. The positioning slot 63 of the locking member 60 receives the post 32 of the tray 30, thereby the positioning portion 64 blocking the post 32 from sliding away from the horizontal portion of the corresponding latch slot 23. When it is desired to remove the disk drive 40, the operating portion 61 of the locking member 60 is pressed to pivot the positioning portion 64 away from the second side wall 207, thereby releasing the post 32 of the tray 30 to allow the post 32 to slide from the horizontal portion to the vertical portion of the corresponding latch slot 23 by pushing the disk drive 40. Thus, the disk drive 40 and the tray 30 can be detached from the bracket 20.

Figure 4:
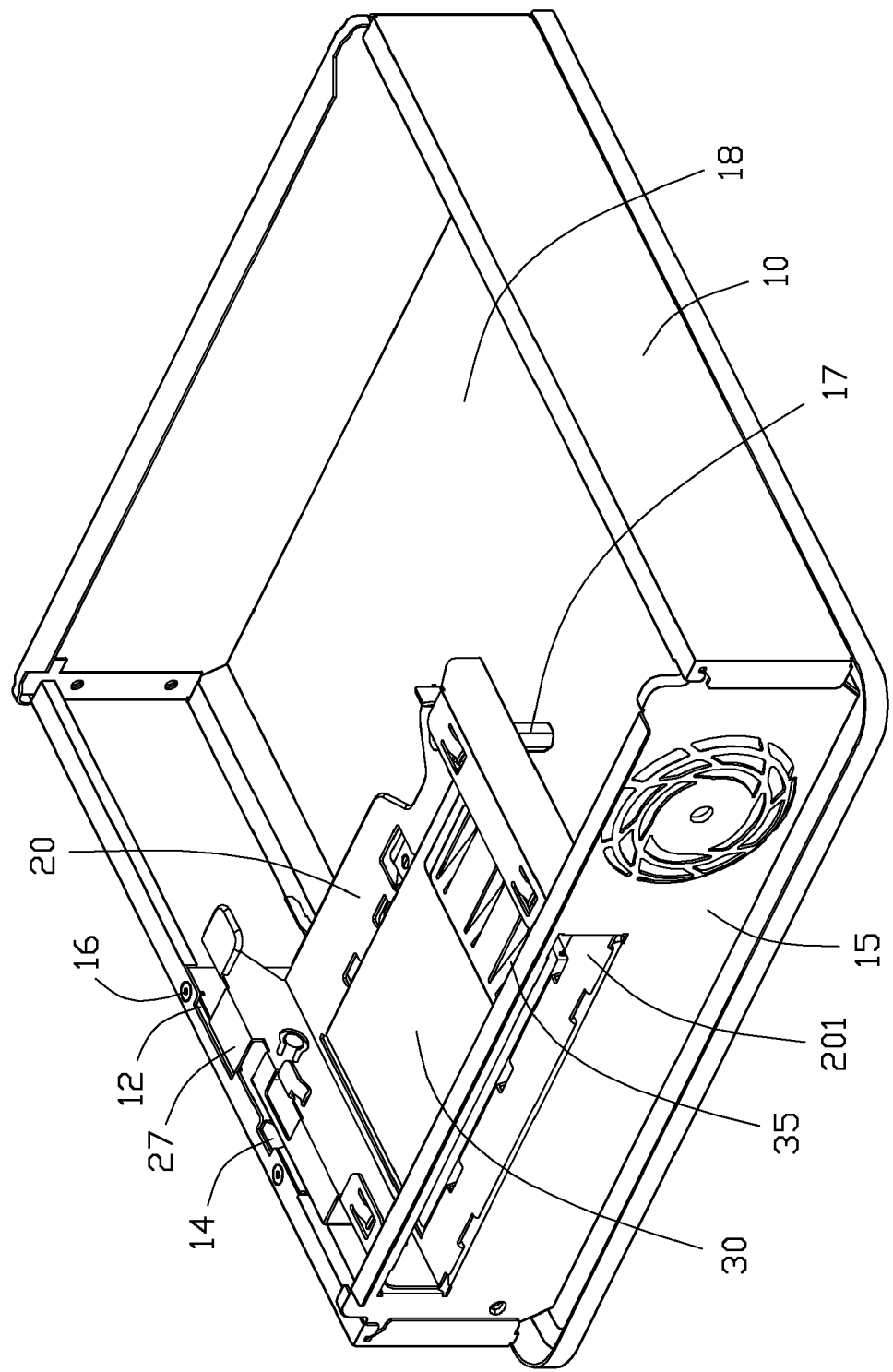
FIG. 4 is an assembled view of FIG. 1.

Referring also to FIG. 4, the bracket 20 is fixed on the chassis 10. The post 251 of the first bent piece 25 of the bracket 20 is inserted into the horizontal portion from the vertical portion of the latch slot 14. The vertical portion of the second bent piece 27 is inserted into the locking slot 12. The bottom wall 201 of the bracket 20 is retained on the support piece 151 of the rear plate 15 of the chassis 10. The mounting hole 22 of the bracket 20 aligns with the mounting hole of the pole 17 of the bottom plate 18 of the chassis 10. A mounting member 50, such as a screw, is inserted into the mounting hole of the pole 17 via the mounting hole 22, thereby preventing the post 251 of the bracket 20 sliding out from the latch slot 14. The bracket 20 is thus stably secured in the chassis 10.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A computer enclosure, comprising:
   a chassis comprising a bottom plate, a side plate and a rear plate perpendicularly connected with each other, the side plate defining a first mounting slot and a second mounting slot, a pole being disposed on the bottom plate; and
   a bracket secured in the chassis for receiving a second data storage device therein, the bracket having a post capable of sliding into the first mounting slot and a bent piece capable of inserting into the second mounting slot, the bracket being supported on the pole of the bottom plate, a locking member pivotably attached to the bracket for retaining the second data storage device, a pivot shaft formed in a middle portion of the locking member, a resilient finger tab extending from the locking member for retaining the locking member in an original position; wherein an opening is defined in the rear plate of the chassis, and a support piece being perpendicularly bent in from a bottom edge of the opening configured for supporting the bracket; the bracket comprises a bottom wall, one side of which is retained on the support piece, and a mounting hole corresponding to the pole of the chassis is defined in an opposite side of the bottom wall, and a mounting member being inserted into the pole via the mounting hole; two parallel first side walls are bent from opposite edges of the bottom wall in a first direction for securing a first disk drive therebetween, and the bottom wall defining an opening for inserting the second disk drive; and two parallel second side walls are bent from opposite edges of the opening in a second direction for securing the second disk drive therebetween, the second direction opposes the first direction.

2. The computer enclosure as described in claim 1, wherein an L-shaped first bent piece extends outward from a top edge of the first side wall, the post being fixed on the first bent piece.

3. The computer enclosure as described in claim 1, wherein the first mounting slot is L-shaped and comprises a horizontal portion parallel to a top edge of the side plate and a vertical portion perpendicular to the top edge of the side plate connecting the horizontal portion with the top edge of the side plate.

4. The computer enclosure as described in claim 1, wherein a bent flange is bent in from a top edge of the side plate, a securing piece parallel to the side plate being fixed on an inner surface of the side plate below the bent flange, the first mounting slot and the second mounting slot being defined in the bent flange of the side plate and the securing piece.

5. A computer enclosure, comprising:
   a chassis comprising a bottom plate, a side plate and a rear plate perpendicularly connected with each other, the side plate defining a first mounting slot and a second mounting slot, the rear plate defining an opening therethrough, a support piece being bent in from a bottom edge of the opening, a pole being disposed on the bottom plate; and
   a bracket secured in the chassis configured for receiving a data storage device via the opening, a first side portion of the bracket defining a post and a bent piece and being supported on the side plate of the chassis, the post being capable of sliding into the first mounting slot and the bent piece capable of inserting into the second mounting slot, a second side portion of the bracket being perpendicular to the first side portion and supported on the support piece of the chassis, one corner portion of the bracket away from the side plate and the rear plate being supported on the pole of the chassis;

wherein the bracket comprises a bottom wall parallel to the bottom plate, a pair of first side walls extending from the bottom wall in a first direction perpendicular to the bottom plate, a pair of second side walls extending from the bottom wall in a second direction opposing to the first direction.

6. The computer enclosure as described in claim 5, wherein a first space is formed between the first side walls and communicating with the opening of the chassis for receiving the data storage device via the opening, a second space is formed between the second side walls for receiving another data storage device therebetween.

7. The computer enclosure as described in claim 6, wherein a mounting hole corresponding to the pole of the chassis is defined in the bottom wall, a mounting member being inserted into the pole via the mounting hole.

8. The computer enclosure as described in claim 6, wherein an L-shaped first bent piece extends outward from a top edge of the first side wall, the post being fixed on the first bent piece.

9. The computer enclosure as described in claim 6, further comprising a locking member pivotably attached to the bracket, wherein the another data storage device is slidably attached to the bracket in the second space and the locking member acts to lock the another data storage device in the second space.

10. The computer enclosure as described in claim 6, further comprising a tray secured in the bracket configured for separating the data storage device and the another data storage device, the tray defining a top wall and two parallel side walls perpendicularly bent from opposite edges of the top wall for securing the another data storage device therebetween.

11. The computer enclosure as described in claim 10, wherein one of the side walls of the tray defines a slot for securing a post of the another data storage device, the slot comprises a horizontal portion extending along a direction parallel to the top wall of the tray, and a vertical portion extending along a direction perpendicular to the top wall of the tray configured for providing an access to the post to enter into the horizontal portion.

12. The computer enclosure as described in claim 11, wherein at least one slanted resilient finger piece is formed on the top wall of the tray for pressing the disk drive to urge the post of the disk drive to tightly engage with the slot.

13. The computer enclosure as described in claim 10, wherein the bracket defines an opening in the bottom wall thereof, the second side walls being perpendicularly bent from opposites edges of the opening, each of the second side walls defining a slot therein for slidably receiving a corresponding post of the another data storage device which is capable of sliding into the second space via the opening of the bottom wall, the top wall of the tray being parallel to the bottom wall of the bracket and covering the opening.

14. The computer enclosure as described in claim 13, wherein the slot of the bracket comprises a horizontal portion extending along a direction parallel to the bottom wall of the bracket for positioning the post of the disk drive therein, and a vertical portion extending along a direction perpendicular to the bottom wall of the bracket for the post of the disk drive sliding thereinto.

15. The computer enclosure as described in claim 5, wherein the first mounting slot comprising a horizontal portion parallel to a top edge of the side plate and a vertical portion perpendicular to the top edge of the side plate.

16. A computer enclosure comprising:
a chassis comprising a bottom plate, a first side plate and a second side plate perpendicularly connected with each other, the first side plate defining an opening therethrough, the second side plate defining a mounting slot, a pole away from the first and second side plates extending from the bottom plate; and
a bracket attached to the first and second side plates, the bracket comprising a bottom wall defining an opening, a pair of first side walls extending from the bottom wall in a first direction perpendicular to the bottom wall, a guiding portion being provided at one of the first side walls and slidably received into the mounting slot, one portion of the bottom wall adjacent to the other one of the first side walls being securely supported on the pole, a pair of second side walls extending from opposite sides of the opening of the bottom wall in a second direction opposing to the first direction, a first space being formed between the first side walls and communicating with the opening of the chassis for receiving a first disk drive via the opening, a second space being formed between the second side walls for receiving therebetween a second disk drive via the opening of the bottom wall before the first disk drive is mounted to the bracket.

* * * * *